(12) United States Patent
Easttom, II

(10) Patent No.: US 9,686,227 B1
(45) Date of Patent: ***Jun. 20, 2017

(54) DOMAIN NAME SERVICE BASED REMOTE PROGRAMMING OBJECTS

(71) Applicant: OPEN INVENTION NETWORK LLC, Durham, NC (US)

(72) Inventor: William Charles Easttom, II, McKinney, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,175

(22) Filed: Apr. 12, 2016

Related U.S. Application Data

(63) Continuation of application No. 14/475,048, filed on Sep. 2, 2014, now Pat. No. 9,313,167, which is a continuation of application No. 13/179,617, filed on Jul. 11, 2011, now Pat. No. 8,825,810.

(60) Provisional application No. 61/362,858, filed on Jul. 9, 2010.

(51) Int. Cl.
*G06F 15/16* (2006.01)
*H04L 29/12* (2006.01)

(52) U.S. Cl.
CPC ...... *H04L 61/1511* (2013.01); *H04L 61/1541* (2013.01); *H04L 61/1552* (2013.01)

(58) Field of Classification Search
CPC ............. H04L 61/1511; H04L 61/1541; H04L 61/1552
USPC ......................................................... 709/219
See application file for complete search history.

(56) References Cited

U.S. PATENT DOCUMENTS

| | | | | |
|---|---|---|---|---|
| 6,182,141 B1* | 1/2001 | Blum | ...................... | H04L 29/06 709/227 |
| 7,398,370 B2* | 7/2008 | Kimura | ................... | G06F 9/548 709/217 |
| 7,502,856 B1* | 3/2009 | Phillips | ............. | G06F 17/30876 709/225 |
| 7,769,784 B2* | 8/2010 | Chagoly | ............... | G06F 9/5083 707/803 |
| 2006/0294493 A1* | 12/2006 | Melby | ................... | G06F 9/4425 717/104 |
| 2011/0320524 A1* | 12/2011 | Nandagopal | ...... | H04L 29/12066 709/203 |

* cited by examiner

*Primary Examiner* — Viet Vu
(74) *Attorney, Agent, or Firm* — Haynes and Boone, LLP

(57) ABSTRACT

The embodiments describe an apparatus for accessing a remote object. The apparatus includes a transceiver. The transceiver is configured to transmit a Domain Name Service request of the remote object to a Domain Name Service server and receive a Domain Name Service response comprising an Internet Protocol of the remote object. The transceiver is further configured to connect to the Internet Protocol of the remote object based on the Domain Name Service response.

18 Claims, 8 Drawing Sheets

100

500

DOMAIN NAME SERVICE BASED REMOTE PROGRAMMING OBJECTS

CROSS-REFERENCE TO RELATED APPLICATIONS

This application is a continuation of U.S. application Ser. No. 14/475,048, filed on Sep. 2, 2014, entitled "DOMAIN NAME SERVICE BASED REMOTE PROGRAMMING OBJECTS", now issued U.S. Pat. No. 9,313,167, issued on Apr. 12, 2016, which is a continuation of U.S. application Ser. No. 13/179,617, filed on Jul. 11, 2011, entitled "DOMAIN NAME SERVICE BASED REMOTE PROGRAMMING OBJECTS", now issued U.S. Pat. No. 8,825,810, issued on Sep. 2, 2014, which in turn claims the benefit of prior filed U.S. Provisional Application Ser. No. 61/362,858, filed on Jul. 9, 2010, each are incorporated herein by reference.

FIELD

The present invention relates to a system for accessing remote programming objects and, more particularly, to a system for accessing remote programming objects using Domain Name Service (DNS) to manage, locate, and connect to remote programming objects.

BACKGROUND

Domain Name Service (DNS) is used to match domain names to Internet Protocol (IP) addresses. There are extensions to DNS to handle other activities. For instance, when one looks up a domain, if the entry defines the domain as needing encryption keys, then a key exchange can be initiated. Other methodologies allow one to use hashing with DNS records, while others allow for expanding the DNS with a new record.

There are several methods for remotely accessing programming objects. For example, Component Object Model (COM), Distributed Component Object Model (DCOM), Object Linking and Embedding (OLE), .Net, Enterprise Java Beans (EJBs), and Common Object Request Broker Architecture (CORBA) have all been used. For instance, with OLE and COM, each object has a unique ID called a class identifier (CLSID), which is also referred to as a Globally Unique Identifier (GUID). However, these methods are either complex to setup, are technology specific, or require additional infrastructure.

SUMMARY

Certain embodiments of the present invention may provide solutions to the problems and needs in the art that have not yet been fully identified, appreciated, or solved by current systems for accessing remote objects.

In accordance with an embodiment of the present invention, an apparatus for accessing a remote object is provided. The apparatus includes a transceiver. The transceiver is configured to transmit a Domain Name Service request of the remote object to a Domain Name Service server and receive a Domain Name Service response comprising an Internet Protocol of the remote object. The transceiver is further configured to connect to the Internet Protocol of the remote object based on the Domain Name Service response.

In yet another embodiment of the present invention, a method is provided. The method includes transmitting a Domain Name Service request of a remote object to a Domain Name Service server and receiving a Domain Name Service response comprising an Internet Protocol of the remote object. The method also includes connecting to the Internet Protocol of the remote object based on the Domain Name Service response.

In yet another embodiment of the present invention, a computer program is embodied on a non-transitory computer-readable medium. The computer program causes a processor to transmit a Domain Name Service request of a remote object to a Domain Name Service server and to receive a Domain Name Service response comprising an Internet Protocol of the remote object. The computer program further causes the processor to connect to the Internet Protocol of the remote object based on the Domain Name Service response.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

Figure 1:
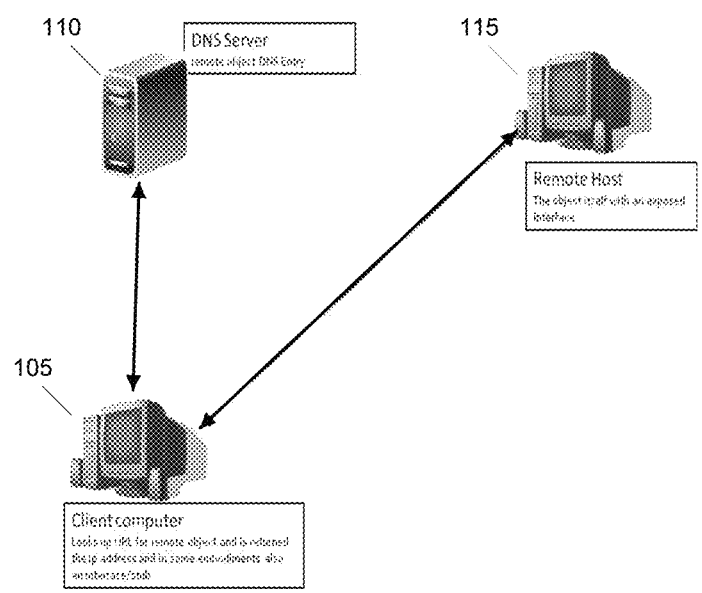
FIG. 1 illustrates a general overview of a system, in accordance with one or more embodiments of the invention.

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein seek to solve at least three problems: (1) the ability to easily access remote programming objects with no investment in infrastructure, (2) the ability to easily move from one type of remote programming access to another, with minimal difficulty, and (3) the flexibility to implement the process in a variety of ways.

In one embodiment, a new DNS record type is created similar to a service (SRV) record. However, the new DNS record type is directed to an object. The DNS record may include the IP address and a port to communicate with. The type of object connection can be a DNS Based Object Connection (DBOC) or the DNS record can be used as simply a more efficient way to locate CORBA, DCOM or Web Service servers. The current options are: DBOC (default, if not defined), CORBA, DCOM, Web Service (.net). The record may require authentication or not. If authentication is required, the record may require a hashed username and password. Also, there may be either no security or Secure Sockets Layer (SSL).

In one or more embodiments described herein, the following DNS record may be used: object.mycompany.com 192.100.100.44, DBOC, none, SSL. The record may define that remote objects are available at object.mycompany.com at the following IP address: 192.100.100.44. The record may also define that the objects can be accessed via the DNS Based Object Connection (DBOC), that no authentication is required, and SSL is required for transmission. In another embodiment, in which a DNS record is used to locate a server for CORBA, DCOM, a Web service, or any other type of object server, the following record can be used: object.mycompany.com 192.100.100.44, CORBA. These records are by way of example and other records and configurations may be used to locate various object servers and types.

FIG. 1 illustrates a general overview of a system 100, in accordance with one or more embodiments of the present invention. System 100 includes a client computer 105, a DNS server 110, and a remote host 115. The DNS server 110 includes an entry of a remote object and the remote host 115 includes the remote object with an exposed interface. In this embodiment, the client computer 105 is configured to look up a Uniform Resource Locator (URL) for the remote object, i.e., by submitting a request to the DNS server 110. In response to the request, the DNS server 110 is configured to return an IP address of the remote object and, in some embodiments, also an interface/stub. As a result, the client computer 105 is able to access the remote object residing on the remote host 115 using the IP address of the remote object.

A person of ordinary skill in the art will readily appreciate that the DNS lookup is like a standard DNS lookup such that only additional information is returned to the client. Other methodologies, such as DCOM and CORBA, require the programmer using the remote object to know details about that object, and to be able to create a stub for that object. However, many embodiments described herein correct this shortcoming by returning a stub object in one of the following formats: Binary or XML. This allows the client computer to use its preferred communication method to receive the stub structure and then utilize the structure. However, a person of ordinary skill in the art will readily appreciate that formats other than Binary or XML are possible.

It should also be appreciated that the client computer 105, the DNS server 110, and remote host 115 can include (but not shown) a processor, memory, a transmitter, a receiver, and/or a transceiver in order to facilitate processing and transmission of data.

Figure 2:
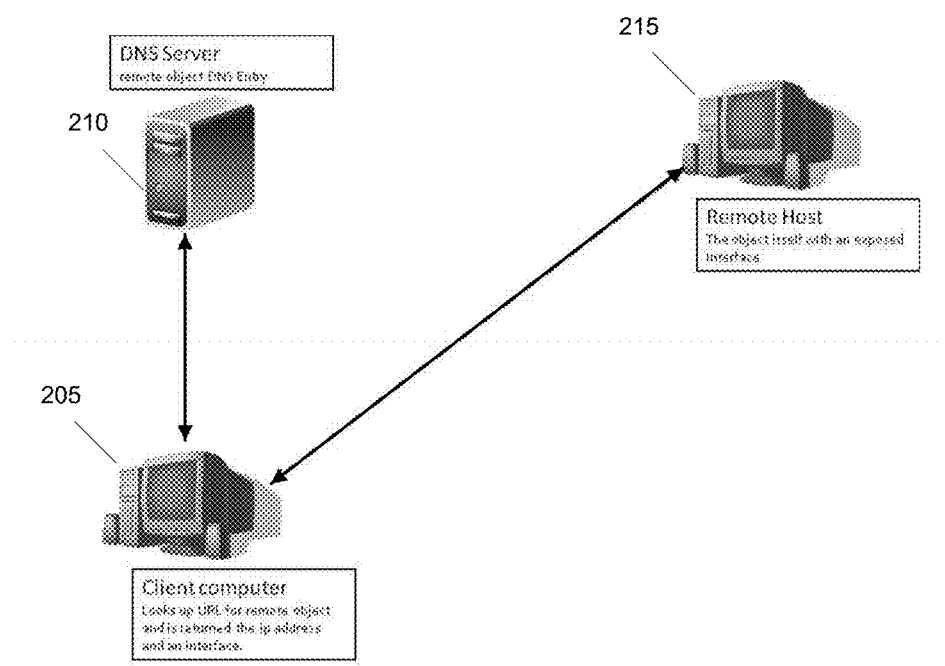
FIG. 2 illustrates a system, in accordance with one or more embodiments of the present invention.

FIG. 2 illustrates a system 200, in accordance with one or more embodiments of the present invention. In FIG. 2, a client computer 205 is configured to look up a URL for a remote object, i.e., by submitting a request to a DNS server 210. The client computer 205 is further configured to receive an IP address and an interface of the remote object from the DNS server 210. The DNS server 210 can also return a stub for the remote object via a Binary file or an XML file before the client 205 connects to a remote host 215. In this embodiment, in order for the stub structure to be returned by the DNS server 210 in response to the DNS query, DNS server 210 is configured to store a file (i.e., an XML file) that includes the structure. For instance, the following DNS entry can be used: object.mycompany.com 192.100.100.44, DBOC, none, SSL, interface.XML.

Figure 3:
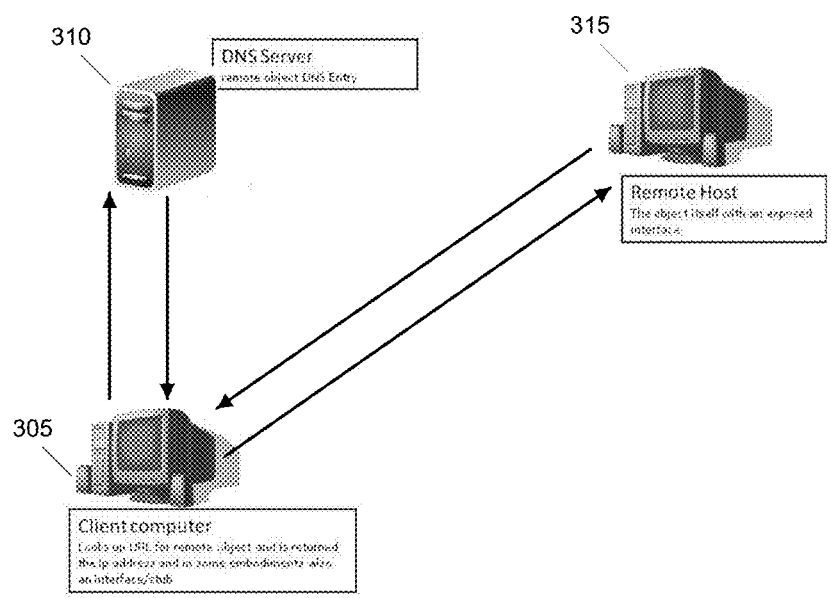
FIG. 3 illustrates a system, in accordance with one or more embodiments of the present invention.

FIG. 3 illustrates a system 300, in accordance with one or more embodiments of the present invention. In FIG. 3, a client computer 305 is configured to look up a URL for the remote object and receive the IP address and, in some embodiments, also an interface/stub of the remote object. In particular, the client computer 305 is configured to transmit a DNS request to a DNS server 310. The DNS request can be, for example, www.somesite.com/object. In response to the DNS request, the client computer 305 is configured to receive a DNS response from the DNS server 310. The DNS response includes an IP address and an XML definition of the remote object's attributes and methods.

The client computer 305 is then configured to transmit a function or property call to the remote object, which resides on a remote host 315. In response to the function or property call, the client computer 305 is configured to receive a result of the function or property call from the remote host 315.

Figure 4:
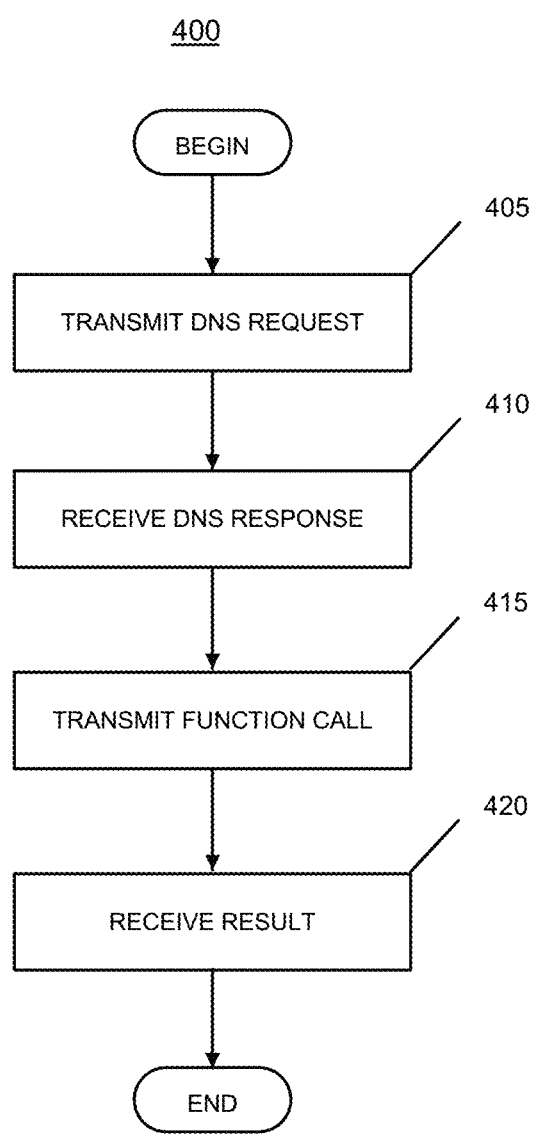
FIG. 4 illustrates a method for making a function or property call, in accordance with one or more embodiments of the present invention.

FIG. 4 illustrates a method 400 for making a function or property call, in accordance with one or more embodiments of the present invention. At 405, a DNS request for a remote object is transmitted to a DNS server. At 410, a DNS response is received from the DNS server. At 415, a function or property call for the remote object is transmitted to a remote host. At 420, a result based on the function or property call is received from the remote host.

Figure 5:
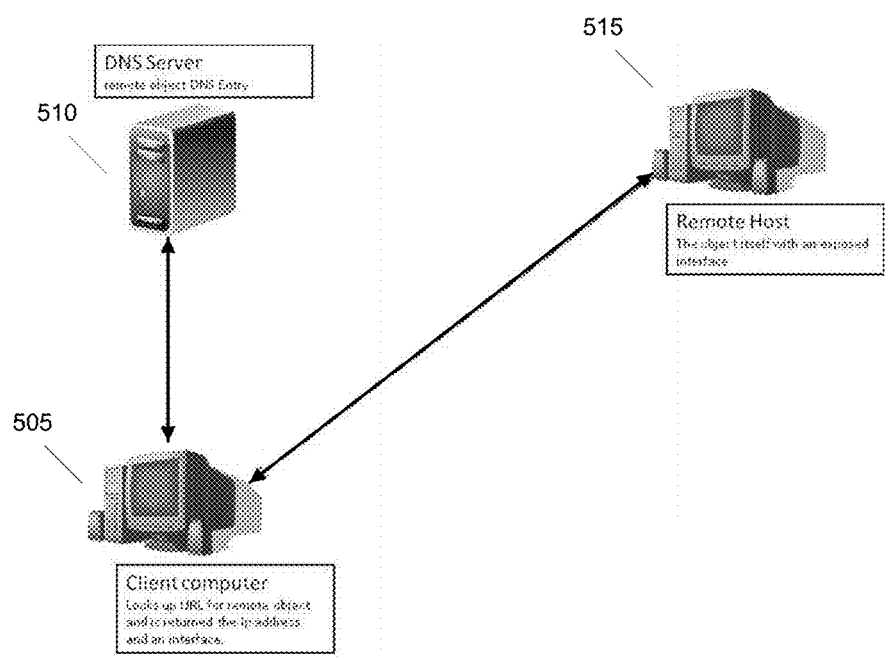
FIG. 5 illustrates a system, in accordance with one or more embodiments of the present invention.

FIG. 5 illustrates a system 500, in accordance with one or more embodiments of the present invention. In this embodiment, a client computer 505 is configured to transmit a DNS request to the DNS server 510 using a URL of a remote object. The DNS server 510 is configured to return an IP address and an interface of the remote object in response to the request. As a result, when the client computer 505 connects to the IP address of the remote object, a stub structure is returned from a remote host 515 as an XML file or in Binary format.

Figure 6:
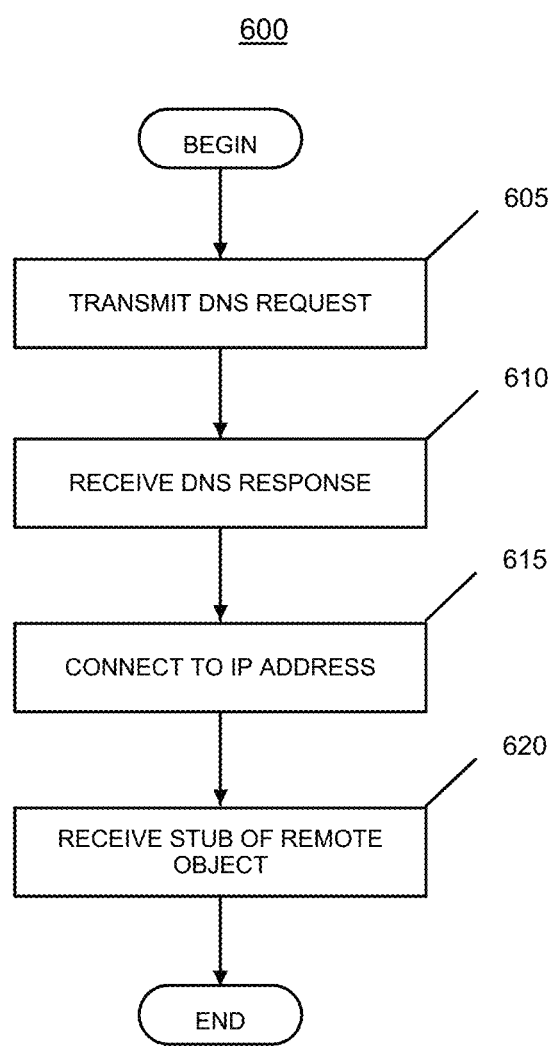
FIG. 6 illustrates a method for receiving a stub structure, in accordance with one or more embodiments of the present invention.

FIG. 6 illustrates a method 600 for receiving a stub structure, in accordance with one or more embodiments of the present invention. At 605, a request is transmitted using a URL of a remote object. In response to the request, a result (i.e., an IP address and an interface of the remote object) is returned at 610. At 615, connection is established to the IP address of the remote object and, at 620, a stub of the remote object is returned via a Binary or XML file.

Figure 7:
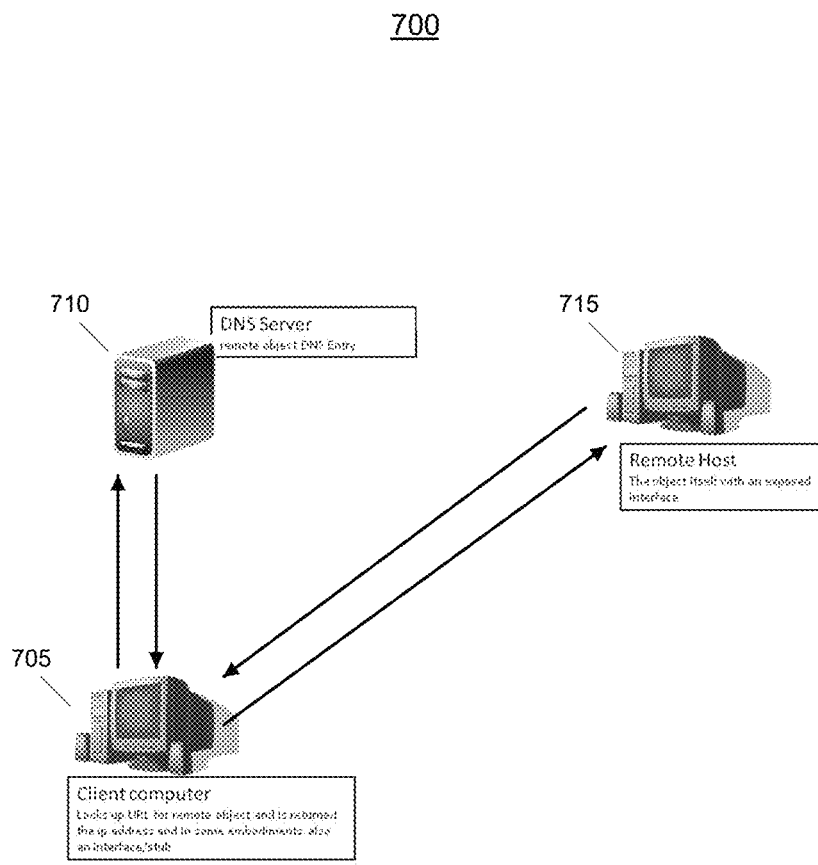
FIG. 7 illustrates a system, in accordance with one or more embodiments of the present invention.

FIG. 7 illustrates a system 700, in accordance with yet another embodiment of the present invention. In this embodiment, a client computer 705 is configured to transmit a DNS request (i.e., www.somesite.com/object) to a DNS server 710 and, in response to the request, the client computer 705 receives a DNS response (i.e., an IP address) from the DNS server 710. In other words, the client computer 705 is configured to look up a URL for a remote object and receive the IP address and, in some embodiments, also receive an interface/stub.

The client computer 705 is configured to transmit a request for an object interface (i.e., the XML interface definition) of the remote object to the remote host 715. In response to the request, the client computer 705 is configured to receive the object interface via an XML document from the remote host 715. After receiving the object interface, communication can begin between the client computer 705 and the remote object, which resides on the remote host 715.

A person of ordinary skill in the art will readily appreciate that details of the remote object interface can be returned to the client in a variety of ways. Further, it should be appreciated that the client computer may receive the interface from the remote host in XML, Binary, or any other form.

The following is an example of an XML remote object:
<?xml version="1.0" encoding="UTF-8"?>
<dataroot xmlns:od="urn:schemas-microsoft-com:office-data"
xmlns:xsi="http://www.w3.org/2001/XMLSchema-instance">
<RemoteObject>
  <Function1>
    <ReturnType></ReturnType>
    <Parameter1></Parameter1>
    <Parameter2></Parameter2>
  </Function1>
  <Function2>
    <ReturnType></ReturnType>
    <Parameter1></Parameter1>
    <Parameter2></Parameter2>
    <Parameter3></Parameter3>
  </Function2>
  <Property1>type</Property1>
  <Property2>type</Property2>
</RemoteObject>
</dataroot>

If the remote object is an employee object, the interface being returned can be as follows:
<?xml version="1.0" encoding="UTF-8"?>
<dataroot xmlns:od="urn:schemas-microsoft-com:office-data"
xmlns:xsi=http://www.w3.org/2001/XMLSchema-instance">
<Employee>
  <SetSalary>
    <ReturnType>Float</ReturnType>
    <OldSalary>Float</OldSalary>
    <NewSalary>Float</NewSalary>
  </SetSalary>
  <SetDemographics>
    <ReturnType>Boolean</ReturnType>
    <Gender>Character</Gender>
    <Age>Integer</Age>
    <MaritalStatus>Boolean</MaritalStatus>
  </SetDemographics>
  <Salary>string</Salary>
  <JobTitle>string</JobTitle>
</RemoteObject>
</dataroot>

Figure 8:
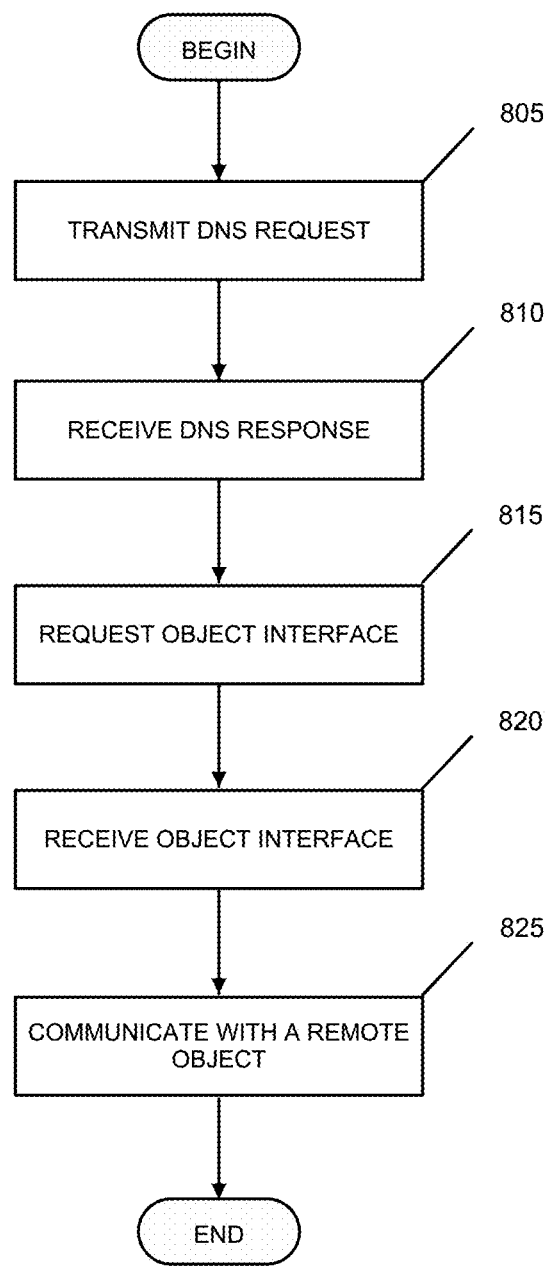
FIG. 8 illustrates a method for requesting and receiving an object interface, in accordance with one or more embodiments of the present invention.

FIG. 8 illustrates a method 800 for requesting and receiving an object interface, in accordance with one or more embodiments of the present invention. At 805, a DNS request is transmitted to a DNS server. In response to the request, a DNS response is returned at 810 from the DNS server. Based on the DNS response, an object interface of a remote object is requested at 815. At 820, the interface is transmitted or returned from a remote host. At 825, upon receiving the interface, communication between a client computer and the remote object can begin.

The method steps shown in FIGS. 4, 6, and 8 may be performed, in part, by a computer program product, encoding instructions for a nonlinear adaptive processor to cause at least the methods described in FIGS. 4, 6, and 8 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIGS. 4, 6, and 8, which may also be stored on the non-transitory computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an Application Specific Integrated Circuit ("ASIC").

A person of ordinary skill in the art will appreciate that the embodiments described herein reduce the infrastructure required to find a remote object. In particular, the embodiments described herein allow existing DNS servers to locate objects and information about objects. Also, not only do the embodiments described herein reduce the amount of infrastructure required, but it is also platform independent. For instance, a Macintosh® programmer using Objective C could access a .Net object residing on a Windows® Server 2008 Machine.

Furthermore, unlike most existing remoting technologies, the user of a remote object is not required to have prior knowledge of the remote object's structure, because the remote object's structure will be returned in response to the DNS query.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a transceiver configured to:
transmit a Domain Name Service request for a remote object to a server using a uniform resource locator of the remote object,
receive a Domain Name Service response comprising an Internet Protocol of the remote object and a stub for the remote object, wherein the Domain Name Service response further comprises a definition of the remote object's attributes and methods; and connect to the Internet Protocol of the remote object based on the Domain Name Service response.

2. The apparatus of claim 1, wherein the remote object is stored on a remote host.

3. The apparatus of claim 1, wherein the Domain Name Service response is based on a Domain Name Service record of the remote object, and the Domain Name Service record is stored in the server and comprises at least one of a Uniform Resource Locator, an Internet Protocol, object connection information, authentication information, and security information.

4. The apparatus of claim 1, wherein the Domain Name Service request comprises a Uniform Resource Locator of the remote object.

5. The apparatus of claim 1, wherein the Domain Name Service response further comprises an Internet Protocol of the remote object and data of the remote object.

6. The apparatus of claim 5, wherein the transceiver is further configured to transmit a function or property call to the remote object based on the data received from the server and receive a function or property call response from the remote object.

7. The apparatus of claim 1, wherein the transceiver is further configured to transmit to the remote host an object interface request of the remote object and receive an interface of the remote object from the remote host, and communicate with the remote object when the interface is received from the remote host, the interface comprising an XML document.

8. A method, comprising:
  transmitting a Domain Name Service request for a remote object to a server using a uniform resource locator of the remote object,
  receiving a Domain Name Service response comprising an Internet Protocol of the remote object and a stub for the remote object, wherein the Domain Name Service response further comprises a definition of the remote object's attributes and methods; and
  connecting to the Internet Protocol of the remote object based on the Domain Name Service response.

9. The method of claim 8, wherein the remote object is stored on a remote host.

10. The method of claim 8, wherein the Domain Name Service response is based on a Domain Name Service record of the remote object, and the Domain Name Service record is stored in the server and comprises a Uniform Resource Locator, an Internet Protocol, object connection information, authentication information, and security information.

11. The method of claim 8, wherein the Domain Name Service request comprises a Uniform Resource Locator of the remote object.

12. The method of claim 8, wherein the Domain Name Service response comprises an Internet Protocol of the remote object and data of the remote object.

13. The method of claim 12, further comprising:
  transmitting a function or property call to the remote object based on the data received from the server and receiving a function or property call response from the remote object.

14. The method of claim 8, further comprising:
  transmitting to the remote host an object interface request of the remote object;
  receiving an interface from the remote host; and
  communicating with the remote object when the interface is received from the remote host,
  wherein the interface comprises an XML, document.

15. A computer program embodied on a non-transitory computer-readable medium, the computer program configured to cause a processor to:
  transmit a Domain Name Service request for a remote object to a server using a uniform resource locator of the remote object;
  receive a Domain Name Service response comprising an Internet Protocol of the remote object and a stub for the remote object, wherein the Domain Name Service response further comprises a definition of the remote object's attributes and methods; and
  connect to the Internet Protocol of the remote object based on the Domain Name Service response.

16. The computer program of claim 15, wherein the remote object is stored on a remote host.

17. The computer program of claim 15, wherein the Domain Name Service response is based on a Domain Name Service record of the remote object, and the Domain Name Service record is stored in the server and comprises a Uniform Resource Locator, an Internet Protocol, object connection information, authentication information, and security information.

18. The computer program of claim 15, wherein the Domain Name Service request comprises a Uniform Resource Locator of the remote object.

* * * * *